US005189605A

United States Patent [19]

Zuehlke et al.

[11] Patent Number: 5,189,605

[45] Date of Patent: Feb. 23, 1993

[54] CONTROL AND HYDRAULIC SYSTEM FOR A LIFTCRANE

[75] Inventors: Arthur Zuehlke; David Pech, both of Manitowoc, Wis.

[73] Assignee: The Manitowoc Company, Inc., Manitowoc, Wis.

[21] Appl. No.: 418,879

[22] Filed: Oct. 10, 1989

[51] Int. Cl.[5] .......................... G05B 11/01; G05B 11/32

[52] U.S. Cl. .......................... 364/140; 364/175; 364/424.07

[58] Field of Search .......................... 340/685; 91/207; 60/426, 327; 364/140, 424.07, 175

[56] References Cited

U.S. PATENT DOCUMENTS

| | | | |
|---|---|---|---|
| 3,335,568 | 8/1967 | Van De Hey | 60/54 |
| 3,851,766 | 12/1974 | Gill et al. | 60/426 |
| 4,178,591 | 12/1979 | Geppert | 340/685 |
| 4,185,280 | 1/1980 | Wilhelm | 364/424.07 |
| 4,268,013 | 5/1981 | Khan | 91/207 |
| 4,451,893 | 5/1984 | Izumi et al. | 364/494 |
| 4,489,551 | 12/1984 | Watanabe et al. | 60/328 |
| 4,510,740 | 4/1985 | Izumi et al. | 60/443 |
| 4,514,796 | 4/1985 | Saulters et al. | 340/685 |
| 4,532,595 | 7/1985 | Wilhelm | 340/685 |
| 4,782,662 | 11/1988 | Reeves et al. | 60/327 |
| 4,815,614 | 3/1989 | Putkonen et al. | 340/685 |
| 5,029,067 | 7/1991 | Nishida | 364/175 |

FOREIGN PATENT DOCUMENTS

| | | |
|---|---|---|
| 0076485A1 | 4/1983 | European Pat. Off. . |
| 0253657A2 | 1/1988 | European Pat. Off. . |
| 3115471A1 | 10/1982 | Fed. Rep. of Germany . |
| 3611553C1 | 7/1987 | Fed. Rep. of Germany . |
| 0364994A1 | 10/1989 | Fed. Rep. of Germany . |
| 72.00064 | 1/1972 | France . |

OTHER PUBLICATIONS

The Liebherr "Technical Data Cable Excavator", at p. 3, col. 1, describes a control system for a liftcrane, Oct. 1986.

The Liebherr "Technical Description", (HS 840, HS 850, HS 870) describes liftcranes including the liftcrane described in reference A, Apr. 1985.

*Primary Examiner*—Jerry Smith

*Assistant Examiner*—Jim Trammell

*Attorney, Agent, or Firm*—Willian Brinks Olds Hofer Gilson & Lione

[57] ABSTRACT

A control system for a liftcrane powered by a closed loop hydraulic system. In a liftcrane that includes controls by which an operator can run the liftcrane and mechanical subsystems each powered by a closed loop hydraulic system having a pump and an actuator, the present invention provides a controller responsive to the controls and connected to the mechanical subsystems, and further in which the controller is capable of running a routine for controlling said mechanical subsystems to define operation of the liftcrane.

20 Claims, 3 Drawing Sheets

CONTROL AND HYDRAULIC SYSTEM FOR A LIFTCRANE

BACKGROUND OF THE INVENTION

This invention relates to liftcranes and more particularly to improved control and hydraulic systems for a liftcrane.

A liftcrane is a type of heavy construction equipment characterized by an upward extending boom from which loads can be carried or otherwise handled by retractable cables. Liftcranes are available in different sizes. The size of a liftcrane is associated the weight (maximum) that the liftcrane is able to lift. This size is expressed in tons, e.g. 50 tons.

The boom is attached to the upper works of the liftcrane. The upper works are usually rotatable upon the lower works of the liftcrane. If the liftcrane is mobile, the lower works include a pair of crawlers (also referred to as tracks). The boom is raised or lowered by means of a cable and the upper works also include a drum upon which the boom cable can be wound. Another drum (referred to as a hoist drum) is provided for cabling used to raise and lower a load from the boom. A second hoist drum (also referred to as the whip hoist drum) is usually included rearward from the first hoist drum . The whip hoist is used to operate certain mechanical systems in association with the first hoist. Different types of attachments for the cabling are used for lifting, clamshell, dragline and so on. Additional mechanical subsystems may be included for operation of a gantry, counterweights, stabilization, counterbalancing and swing (rotation of the upperworks with respect to the lower works.). Mechanical subsystems in addition to these may also be provided.

As part of the upper works, a cab is provided in which an operator can control the liftcrane. Numerous controls such as levers, gears and switches are provided in the operator's cab by which the various mechanical subsystems of the liftcrane can be controlled. Use of a liftcrane requires a high level of skill and concentration on the part of the operator who must be able to simultaneously manipulate and coordinate the various mechanical systems to perform routine operations.

In usual liftcrane design, an engine powers a hydraulic pump that in turn drives an actuator (such as a motor or cylinder) associated with each of the mechanical subsystems. The actuators translate hydraulic pressure forces to mechanical forces thereby imparting movement to the mechanical subsystems of the liftcrane.

In general, there are only two types of hydraulic systems used on construction machinery—open loop and closed loop. Most present liftcranes use primarily an open loop hydraulic system. In an open loop system, hydraulic fluid is pumped (under high pressure provided by a pump) to the actuator. After used in the actuator, the hydraulic fluid flows back (under low pressure) to a reservoir before it is recycled by the pump. The loop is considered "open" because the reservoir intervenes on the fluid return path from the actuator before it is recycled by the pump. Open loops systems control actuator speed with valves. Typically, the operator adjusts a valve to a setting to allow a portion of flow to the actuator, thereby controlling the actuator speed. The valve can be adjusted to supply flow to either side of the actuator thereby reversing actuator direction.

By contrast, in a closed loop system return flow from an actuator goes directly back to the pump; i.e., the loop is considered "closed". Closed loop systems control speed by changing the pump output.

An open loop system has several advantages over a closed loop system. A single pump can be made to power relatively independent, multiple mechanical subsystems by using valves to meter the available pump flow to the actuators. Also, cylinders, and other devices which store fluid, are easily operated since the pump does not rely directly on return flow for source fluid. Because a single pump usually operates several mechanical subsystems, it is easy to bring a large percentage of the liftcrane's pumping capability to bear on a single mechanical subsystem. Auxiliary mechanical subsystems can be easily added to the system.

However, open loop systems have serious shortcomings, the most significant of which is lack of efficiency. A liftcrane is often required to operate with one mechanical subsystem fully loaded and another mechanical subsystem unloaded yet with both turning at full speed, e.g. clamshell, grapple, level-luffing. An open loop system having a single pump must maintain pressure sufficient to drive the fully loaded mechanical subsystem. Consequently, flow to the unloaded mechanical subsystems wastes an amount of energy equal to the unloaded flow multiplied by the unrequired pressure.

Open loop systems also waste energy across the valves needed for acceptable operation. For example, the main control valves in a typical load sensing open loop system (the most efficient type of open loop system for a liftcrane) dissipates energy equal to 300–400 PSI times the load flow. Counterbalance valves required for load holding typically waste energy equal to 500–2,000 PSI times the load flow.

As a result of the differences in efficiency noted above, the single pump open loop system requires considerably more horsepower to do the same work as the closed loop system. This additional horsepower could easily consume thousands of gallons of fuel annually. Moreover, all this wasted energy converts to heat. It is no surprise, therefore, that open loop systems require larger oil coolers than comparable closed loop systems.

Controllability can be another problem for open loop circuits. Since all the main control valves are presented with the same system pressure, the functions they control are subject to some degree of load interference, i.e., changes in pressure may cause unintended changes in actuator speed. Generally, open loop control valves are pressure compensated to minimize load interference. But none of these devices are perfect and speed changes of 25% with swings in system pressure are not atypical. This degree of speed change is disruptive to liftcrane operation and potentially dangerous.

To avoid installing a very large pump in single pump, open loop circuits, a device that limits flow demand is usually fitted to the liftcrane hydraulic system. Such devices, along with the required load sensing circuits and counterbalance valves mentioned above, are prone to instability. It can be very difficult to adjust these devices to work properly under all the varied operating conditions of a liftcrane.

An approach taken by some liftcranes manufacturers with open loop systems to minimize the aforementioned problems is to use multi-pump open loop systems. This approach surrenders the main advantage that the open loop has over closed loop, i.e. the ability to power many functions with a single pump.

In summary, although presently available liftcranes generally use open loop hydraulic systems, these are very inefficient and this inefficiency costs the manufacturers by requiring large engines and oil coolers and it costs the user in the form of high fuel bills. Moreover, another disadvantage is that open loop systems in general can have poor controllability under some operating conditions.

Accordingly, it is an object of the present invention to provide a liftcrane having a improved control and hydraulic systems.

It is another object of the invention to provide a control system for a liftcrane that can automate and augment the skills of the operator.

It is a further object of the present invention to provide a control system that simplifies the controls used by an operator.

It is a further object to the present invention to provide a control system that can maximize the efficiency of a hydraulic system used for powering a liftcrane.

It is another object of the present invention to provide a hydraulic system that is highly efficient and can provide for the high power demands of the liftcrane.

It is another object of the present invention to provide a control system that can enhance the safety features of the liftcrane.

Still another object of the present invention is to provide a control system for a liftcrane that can easily be modified and upgraded.

Still another object of the present invention is to provide a control system that can easily be augmented for the addition of new features or for use on liftcranes having a different combination of equipment.

Still yet another object of this invention is to provide a control system that is easy to maintain and trouble-free in operation.

SUMMARY OF THE INVENTION

The present invention provides a control system for a liftcrane powered by a closed loop hydraulic system. In a liftcrane that includes controls by which an operator can run the liftcrane and mechanical subsystems each powered by a closed loop hydraulic system having a pump and an actuator, the present invention provides a programmable controller responsive to the controls and connected to the mechanical subsystems, and further in which the controller is capable of running a routine for controlling said mechanical subsystems to define operation of the liftcrane.

DESCRIPTION OF PRESENTLY PREFERRED EMBODIMENTS

Figure 1:
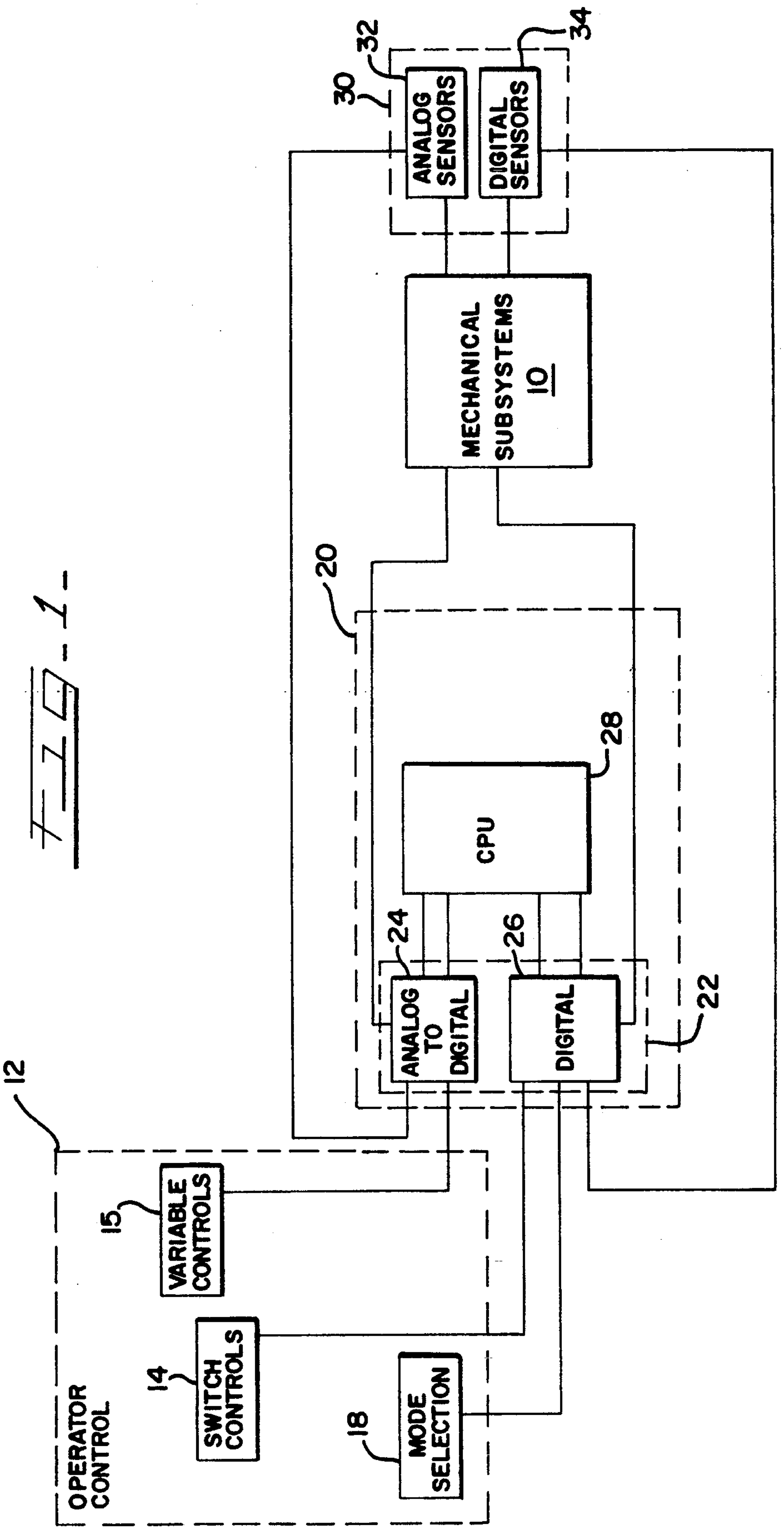
FIG. 1 is a flowchart depicting the control system of the present invention.

FIG. 1 depicts a flowchart of the control system for the liftcrane. The various mechanical subsystems 10 of the liftcrane include the pumps and actuators for the front hoist, rear hoist (whip), swing, boom, and left and right crawlers. In addition, there are subsystems for such things as counterweight handling, crawler extension, gantry raising, fan motors, warnings lights, heat exchangers, and so on. The mechanical subsystems 10 are under the control of an operator who occupies a position in the cab in the upper works of the liftcrane. In the cab are various operator controls 12 used for operation and control of the mechanical systems of the liftcrane. These operator controls 12 can be of various types such as switches, shifting levers etc., but can readily be divided into switch-type controls 14 (digital, ON/OFF, two position) and variable controls 15 (analog or multiple position). The switch-type controls 14 are used for on/off type activities, such as setting a brake, whereas the variable controls 15 are used for activities such as positioning the boom, hoists, or swing. In addition, the operator controls 12 include a mode selector 18 whose function is to tailor the operation of the liftcrane for specific type of activities, as explained below. (For purposes of the control system of this embodiment, the mode selector 18 is considered to be a digital device even though there may be more than two modes available). In the present embodiment, the mode selection switch 18 includes selections for main hydraulic mode, counterweight handling mode, crawler extension mode, high speed mode, clamshell mode and free-fall mode. Some of these modes are exclusive of others (such as clamshell and free-fall) where their functions are clearly incompatible; otherwise these modes may be combined.

The outputs of the operator controls 12 are directed to controller 20 and specifically to interface 22 of controller 20. Interface 22 contains an analog to digital interface 24 responsive to the variable controls 15 and a digital-to-digital interface 26 responsive to the switch-type controls 14 and mode selector 18. Interface 22 in turn is connected to a CPU (central processing unit) 28. Controller 20 may be a unit such as Model No. CCS-080 manufactured by Hydro Electronic Devices Corporation. The CPU 28 may be an Intel 8052. Controller 20 should be designed for heavy duty service under the conditions associated with outdoor construction activity. In the preferred embodiment controller 20 is enclosed in a water-tight sealed metal container inside the cab.

The CPU 28 runs a routine which recognizes and interprets the commands from the operator (via operator control 12) and outputs information back through interface 22 directing the mechanical subsystems 10 to function in accordance with the operator's instructions. Movements, positions and other information about the mechanical subsystems 10 are monitored by sensors 30 which include both analog sensors 32 and digital sensors 34. Information from the sensors 30 is fed back to the interface 22 and in turn to the CPU 28. This information about the mechanical subsystems 10 provided by the sensors 30 is used by the routine running on the CPU 28 to determine if the liftcrane is operating properly.

The present invention provides significant advantages through the use of the controller 20. As mentioned above, a high level of skill and concentration is required of liftcrane operators to coordinate various liftcrane controls to perform routine operations. Even so, some liftcrane operations have to be performed very slowly to ensure safety. These operations can be very tedious. Through the use of the routine provided by the control system and running on the CPU 28, various complicated maneuvers can be simplified or improved.

One example of how the present invention can improve liftcrane operation is mode selection. Mode selection refers to tailoring the operation of the liftcrane for the particular task being performed. The mode selector 18 is set by the operator to change the way that the crane operates. The change in mode is carried out by the routine on CPU 28. With the change in mode, various of the operator controls 12 in the cab function in distinctly different ways and even control different mechanical subsystems in order that the controls are specifically suited to the task to be accomplished. With the change of mode, the routine can establish certain functional relationships between several separate mechanical subsystems for particular liftcrane activities (such as dragline or clamshell operations). Previously, such operations required sometimes difficult simultaneous coordination of several different controls by the operator.

Another example of how this embodiment of the invention can improve liftcrane operation is that the variable controls 15 can be set for either fine, precise, small-scale movements or for large-scale movements of the corresponding mechanical subsystems. Thus fewer and simpler controls may be needed in the operator's cab.

Still another example of how this embodiment of the invention improves liftcrane operation is in ease of maintenance and trouble-shooting. Instead of attempting to monitor each discreet mechanical subsystem, as in previous liftcranes, a mechanic can obtain information on all the mechanical subsystems of the liftcrane by connecting a computer (such as a laptop personal computer) to the controller and downloading the sensor data. Similarly, trouble-shooting could be accomplished by inputting specific control data directly to the controller, measuring the resultant sensor data, and comparing this to the expected sensor data.

Figure 2:
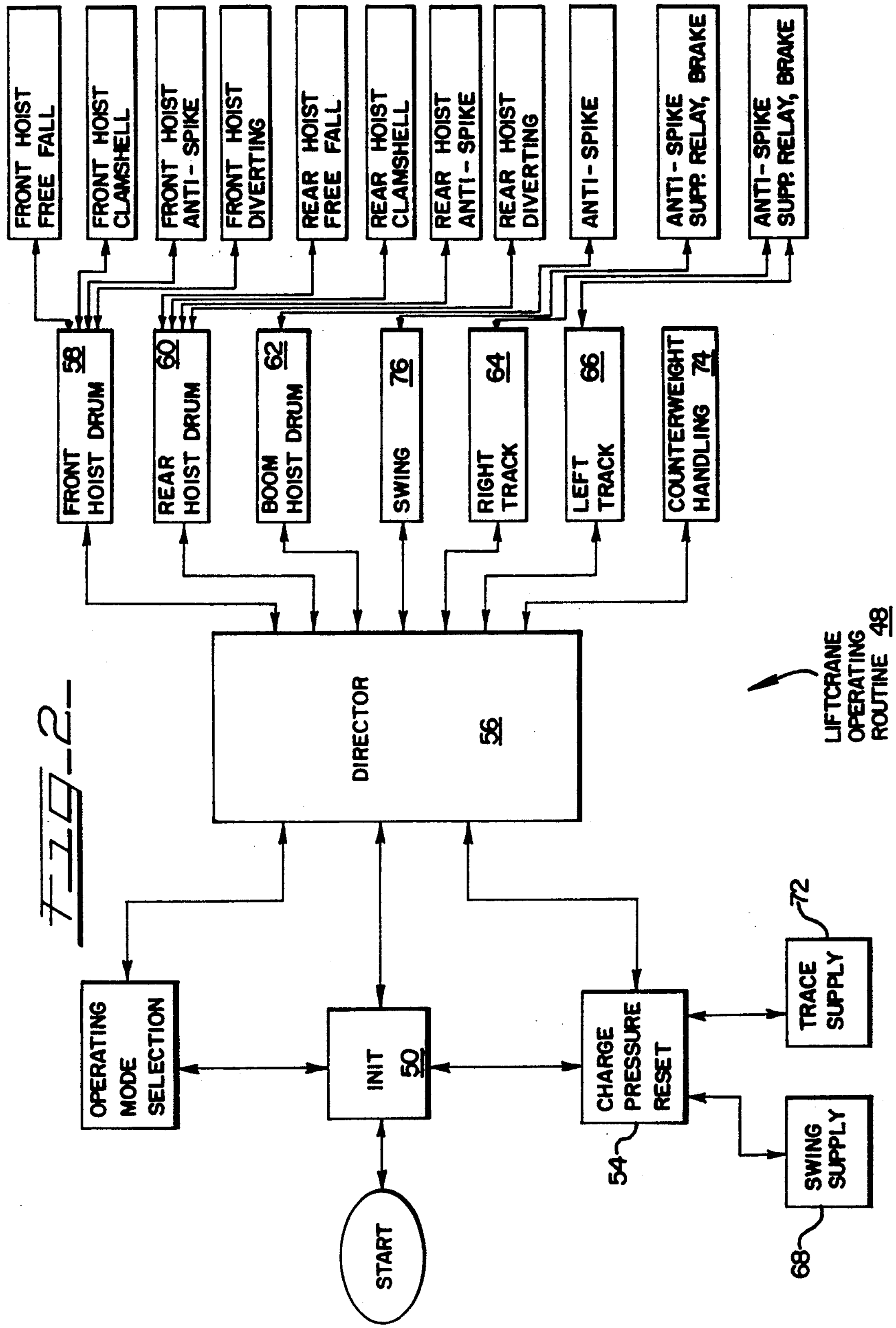
FIG. 2 is a flowchart of the liftcrane operating routine capable of running on the control system depicted in FIG. 1.

Referring to FIG. 2, there is depicted a flowchart of the liftcrane operating routine 48 of the present invention. This routine is stored in CPU 28. In this embodiment, routine 48 is stored in EPROM although other media for storage may be used. The source code for this routine is set out in Appendix 1. This routine set forth in Appendix 1 is specifically tailored for liftcrane standards in the Netherlands and includes provisions specifically directed to the safety standards there. However, the routine may also be used in the United States and in other countries or could easily be modified following the principles set out herein.

The liftcrane operating routine 48 is intended to run continuously on the CPU 28 (in FIG. 1) in a loop fashion. The liftcrane operating routine 48 reads information provided from the interface 20 (in FIG. 1) which appears as data accessible to the routine at certain addresses. Likewise, the information output by liftcrane operating routine 48 is read by the interface 20 and is used to operate the mechanical subsystems 10. When the liftcrane is initially turned on (or if the routine reboots itself or restores itself due to a transient fault), the liftcrane operating routine 48 includes an initialization subroutine 50 that initializes variables and reads certain parameters. Following this, an operating mode subroutine 52 reads data indicating which operating mode has been selected by the operator for the liftcrane. Next, a charge pressure reset/ out of range subroutine 54 checks to determine if the hydraulic pressure in the liftcrane is in a proper operating range. Following this is a director subroutine 56 which is the main subroutine for the operation of the crane. From the director subroutine 56 the program branches into one of five subroutines associated with operation of the major mechanical subsystems. These subroutines control the function of the major mechanical subsystems with which they are associated front hoist drum subroutine 58, rear hoist drum subroutine 60, boom hoist drum subroutine 62 right track subroutine 64, and left track subroutine 66. After these subroutines finish, the liftcrane operating routine 48 returns to the operating mode subroutine 52 and the starts all over again. As the routine cycles, changes made by the operator at the controls will be read by the liftcrane operating routine and changes in the operation of mechanical systems will follow. In addition, there are subroutines for swing supply and track supply that are run from the charge pressure reset/ out-of-range subroutine 54. In the event that the pressure is not in the proper operating range, brakes will be applied to the swing and track to insure safety. A counterweight handling subroutine 74 branches from the director subroutine 56. A swing subroutine 76 also branches from the director subroutine 54. The swing subroutine 76 is called during each cycle of the director subroutine 54 to enhance a smooth movement of the swing.

A watchdog chip is provided in controller 20 so that in the event of a failure of the operating routine or of any of the operating hardware, the CPU will reboot itself and start the initialization process 50 again.

To provide additional modes of operation or to alter the response of any of the components of the mechanical subsystems 10, the liftcrane operating routine 48 can be augmented or modified. For example additional subroutines can be provided for new operating modes. One example is a level luffing operating mode. Level luffing refers to horizontal movement of a load. This involves both movement of the boom and simultaneous movement of the load hoist. This is a procedure requiring a high degree of skill on the part of the operator part and it is often performed when moving loads across horizontal surfaces such as floors. Movement of loads horizontally is often required in liftcrane operation, but can be very difficult to do where it may be required to move the load out of sight of the liftcrane operator. Through appropriate programming and computation of trigonometric functions in the liftcrane operating routine, load level luffing can be precisely and easily provided.

Still another example of a type of a subroutine that can be provided by the control system of the present invention is operation playback. With the addition of a means for data storage, the controller can provide that once an operator performs a certain operation or activity, regardless of how complicated it is, the operation can be recorded and "learned" by the routine on the CPU 28. Then the same activity can be played back by the operator and performed over and over again, thereby eliminating some of the tedium and difficulty of the operation.

In addition, another subroutine that can be added would be an area avoidance subroutine. Where the liftcrane is operating in a location near easily damaged items or hazardous materials such as electric lines or in a chemical plant, the liftcrane operator can provide information via the control panel indicating areas prohibited to the movement of the liftcrane. The liftcrane operating subroutine would then completely prevent any liftcrane movements that might impinge on the prohibited area thereby highly enhancing the safety of the liftcrane operation. This could be accomplished by having the liftcrane operator first move the crane to a boundary in one direction and indicate by the control panel that this is a first boundary, and then move the crane through non-prohibited area to a second boundary and indicate by the control panel that this is a second boundary. These boundary positions would be recorded by sensors and stored as data in the operating routine. Thereafter, during each cycle of the operating routine, the routine would check the crane movement against the boundaries of the prohibited area and refuse to execute any command that would cause the crane to encroach on the prohibited area.

Another subroutine can provide for use of a counterbalancing system. Such a counterbalancing system is described in copending U.S. Application Ser. No. 07/269,222, U.S. Pat. No. 4,953,722 entitled "Crain And Lift .Enhancing Beam Attachment With Movable Counterweight", filed Nov. 9, 1988, and incorporated herein by reference.

Another advantage of the present invention is that the operation and safety features of the liftcrane can easily be adapted for the different requirements of different countries. For example, in the Netherlands an exterior warning light must be provided when the liftcrane is in the free-fall mode. This can readily be provided by the routine by the addition of several lines of code (refer to Appendix 1, lines 2000 to 2095).

The flexibility of the control system of the present invention finds particular advantage when used in conjunction with the closed loop hydraulic system of the present invention. Most liftcranes use an open loop system which have the inherent disadvantages, as mentioned above. The present invention uses a closed loop hydraulic system that operating under the control system.

Figure 3:
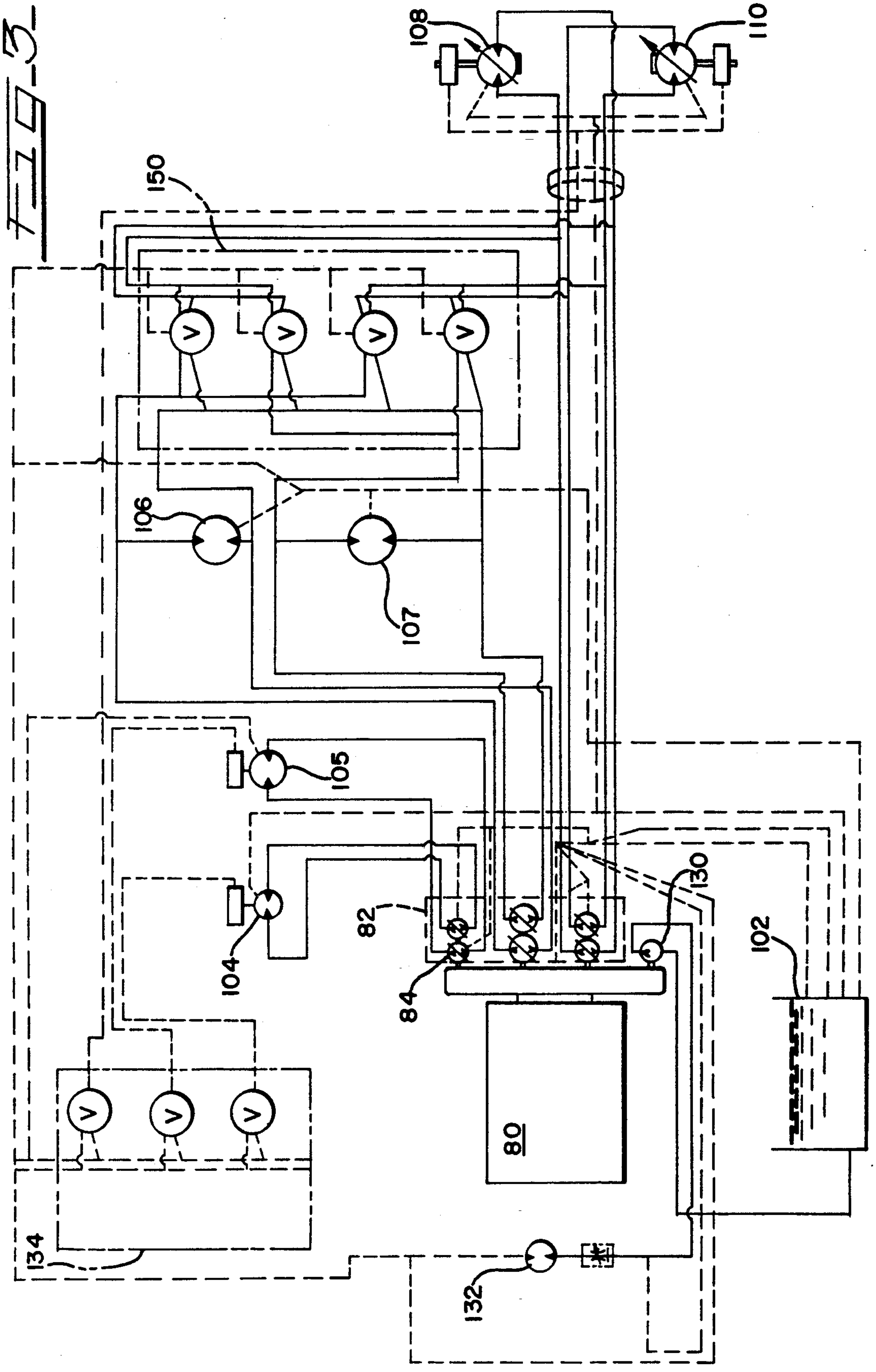
FIG. 3 is a diagram of the closed loop hydraulic system of the present embodiment.

Referring to FIG. 3, there is represented an engine 80 in the present embodiment of the invention. In this embodiment, engine 80 can produce 210 horsepower. The engine size is chosen to be suitable for the size the liftcrane which in this case is rated at 50 tons. For different sizes of liftcranes different sizes of engines would be used.

Engine 80 drives a plurality of main pumps 82. In the present embodiment, there are six main pumps, each associated with one of the major mechanical subsystems of the liftcrane. Each of the pumps drives an actuator (motor) associated with its mechanical subsystem. Each of the six actuators is connected to its corresponding pump by a pair of hydraulic lines to form the closed loop. This enables application of hydraulic force to the actuators in either direction. A reservoir 102 is connected to the engine 80 outside of the closed loops between the pumps 82 and the six mechanical subsystems.

The actuators in the major mechanical subsystems include the following: A swing motor 104 controls the swing (movement of the upper works in relation to the lower works). A boom hoist motor 106 raises and lowers the boom. A rear hoist motor 100 controls the rear hoist drum and the front hoist motor 102 controls the front hoist drum. A left and right crawler motors 108 and 110 control the tractor crawlers, respectively. Additional mechanical subsystems may be powered either by use of an auxiliary pump and motor, such as fan pump 130 and fan pilot motor 132, or by the use of small low hydraulic pilot pressure lines that may be tapped off of the main hydraulic pumps. The present invention uses this latter method to power the crawler extenders and gantry. These mechanical subsystems are connected to actuators associated with them by a solenoid valve 134.

One of the drawbacks normally associated with the closed loop system is lack of power. The present invention overcomes this drawback by means of the diverting valve assembly 150. Diverting valve assembly 150 operates to combine the closed loops of two or more pumps with a single actuator so that the operation of the mechanical subsystem associated with the actuator can take advantage of more than just the single actuator normally associated with it. Consequently, the closed loop hydraulic system of the present invention is able to duplicate performance of the open loop system while also providing the advantages of the closed loop system.

In the present embodiment, the diverting valve assembly 150 provides the ability to direct up to 50% (e.g. 150 GPM) of the liftcrane's total pumping capacity to either main or whip hoist. The diverting valve assembly 150 provides the ability to direct up to 25% of the liftcrane's total pumping capability to as many as four of the auxiliary mechanical subsystems. The diverting valve assembly 150 also has the ability to combine up to four pumps to provide charge or pilot flow sufficient to operate large cylinders (e.g. 75 GPM).

The use of the closed loop system provides significant advantages over the open loop system. For example, with the closed loop system of the present embodiment, there is eliminated the need for the large, load sensing pump with the attendant control valves and flow demand limiting devices that are essential in open loop systems.

The ability to operate the diverting valve assembly 150 in the manner described is enabled by the control system of the present invention. The operation of the diverting valve assembly 150 to meet or exceed the levels of performance associated with an open loop system is provided by the routine described herein. As a result, the present invention can provide a high level of performance combined with economy and efficiency. Moreover, the present invention provides new features to augment an operator's skill and efficiency and also can provide a higher level of safety heretofore unavailable in liftcranes.

APPENDIX I

```
1 REM M-SERIES MACHINE PROGRAM. DUTCH STANDARD. ver. 1.0 9/24/89

2 REM COPYRIGHT (C) 1989 AN UNPUBLISHED WORK

3 REM BY THE MANITOWOC CO. INC.  ALL RIGHTS RESERVED

10 CLOCK1:CLEAR

18 XBY(0C003H)=9BH

19 REM ONERR 10
```

```
20 K1=245:K2=5:K3=145:K4=100:DB1=30:DB2=25:K6=235:U=1
31 XBY(0F100H)=255:XBY(0F110H)=225:XBY(0F200H)=255:XBY(0F210H)=255
32 XBY(0F400H)=255:XBY(0F410H)=255
41 P1=5:P2=5:P3=5:P4=0
45 XBY(0F120H)=P1:XBY(0F220H)=P2:XBY(0F420H)=P3:XBY(0F820H)=0
49 P2=P2.OR.80H:P4=P4.OR.191
50 XBY(0F820H)=P4:XBY(0F220H)=P2
55 FOR DD=1 TO 1000:NEXT DD:GOSUB 1300:GOSUB 1200
REM DIRECTOR
165 FOR I=1 TO 30
170 N1=XBY(0F015H)-119:N2=XBY(0F014H)-119:N3=XBY(0F013H)-119
175 N5=XBY(0F011H)-119:N6=XBY(0F010H)-119
200 IF F3 THEN GOSUB 950
219 GOSUB 600
218 IF ABS(N2)>DB1.OR.H2=1 THEN GOSUB 500
220 IF ABS(N1)>DB1.OR.H1=1 THEN GOSUB 450
222 IF ABS(N3)>DB1.OR.H3=1 THEN GOSUB 550
230 IF ABS(N5)>DB1.OR.H5=1 THEN GOSUB 650
234 IF ABS(N6)>DB1.OR.H6=1 THEN GOSUB 700
236 NEXT I
238 IF(H1.OR.H2.OR.H3.OR.H5.OR.H6.OR.Y6.OR.Y7) THEN 165
240 GOSUB 1200:GOSUB 1300:GOTO 165
REM FRONT HOIST DRUM SUBROUTINE
450 IF XBY(6000H)<29 THEN A6=0
452 IF (Q1-A6)=1 THEN D1=1 ELSE D1=0
454 Q1=A6:A6=A6.OR.D1
456 X4=SGN(XBY(0C001H).AND.20H):X6=SGN(XBY(0C001H).AND.80H)
458 F5=SGN(XBY(0C000H).AND.10H):F8=SGN(XBY(0C001H).AND.01H)
460 IF (N1>DB1).AND.(N1<126) THEN A3=1 ELSE A3=0
462 IF (N1<-DB1).AND.(N1>-118) THEN A2=1 ELSE A2=0
464 Z1=X6.OR.F8.OR.A3
466 S1=(F5.OR.A2).AND.A6.AND.F6.AND.(X4.OR.F8.OR.A2).AND.Z1
468 IF X0 THEN N5=N1:S5=S1
470 IF X2 THEN N6=N1:S6=S1
472 IF S1 THEN P4=P4.OR.04H ELSE P4=P4.AND.251
473 GOSUB 600
474 IF A2 THEN P1=P1.OR.10H ELSE P1=P1.AND.239
476 XBY(0F120H)=P1:XBY(0F820H)=P4
```

```
478 IF M3 THEN 1400
480 IF M2 THEN 1600
482 IF XBY(6006H)>182 THEN A4=1 ELSE A4=0
484 M8=(A4.AND.A3.OR.A2).AND.S1:P4=P4.AND.191:XBY(0F820H)=P4
490 IF M8 THEN P3=P3.OR.80H ELSE P3=P3.AND.127
492 XBY(0F420H)=P3
493 XBY(0F100H)=255-((K2*A3)+((ABS(N1)-DB1)/95)*K1)*S1*(A3.OR.A2)
496 H1=1:IF (A3.OR.A2)=0 THEN H1=0
498 RETURN
REM REAR HOIST DRUM SUBROUTINE
500 IF XBY(6001H)<29 THEN A7=0
502 IF (Q2-A7)=1 THEN D2=1 ELSE D2=0
504 Q2=A7:A7=A7.OR.D2
506 X5=SGN(XBY(0C001H).AND.40H):X7=SGN(XBY(0C002H).AND.1H)
508 F5=SGN(XBY(0C000H).AND.10H):F8=SGN(XBY(0C001H).AND.01H)
510 IF (N2>DB1).AND.(N2<126) THEN A1=1 ELSE A1=0
512 IF (N2<-DB1).AND.(N2>-118) THEN A0=1 ELSE A0=0
514 Z2=X7.OR.F8.OR.A1
516 S2=(F5.OR.A0).AND.A7.AND.F6.AND.(X5.OR.F8.OR.A0).AND.Z2
518 IF X1 THEN N5=N2:S5=S2
520 IF X3 THEN N6=N2:S6=S2
522 IF S2 THEN P4=P4.OR.02H ELSE P4=P4.AND.253
523 GOSUB 600
524 IF A0 THEN P1=P1.OR.20H ELSE P1=P1.AND.223
526 XBY(0F120H)=P1:XBY(0F820H)=P4
528 IF M3 THEN 1500
530 IF M2 THEN 1700
532 IF XBY(6007H)>182 THEN A5=1 ELSE A5=0
534 S2=(1-H1).AND.S2
536 M9=(A5.AND.A1.OR.A0).AND.S2
538 IF M9 THEN P3=P3.OR.20H ELSE P3=P3.AND.223
540 XBY(0F420H)=P3
542 XBY(0F110H)=255-((K2*A1)+((ABS(N2)-DB1)/95)*K1)*S2*(A1.OR.A0)
546 H2=1:IF (A1.OR.A0)=0 THEN H2=0
548 RETURN
REM BOOM HOIST DRUM SUBROUTINE
550 IF XBY(6003H)<29 THEN A8=0
551 IF (Q3-A8)=1 THEN D3=1 ELSE D3=0
```

```
552 Q3=A8:A8=A8.OR.D3
553 F5=SGN(XBY(0C000H).AND.10H):F8=SGN(XBY(0C001H).AND.01H)
555 X8=SGN(XBY(0C002H).AND.02H):X9=SGN(XBY(0C002H).AND.04H)
560 F9=SGN(XBY(0C000H).AND.80H)
561 IF (N3>DB1).AND.(N3<126) THEN Y9=1 ELSE Y9=0
562 IF (N3<-DB1).AND.(N3>-118) THEN Y8=1 ELSE Y8=0
568 IF Y9 THEN P1=P1.OR.40H ELSE P1=P1.AND.191
569 XBY(0F120H)=P1
570 S3=(Y9.AND.(X8.OR.F9).OR.Y8.AND.(X9.OR.F8).AND.F5).AND.A8.AND.F6
571 GOSUB 600
573 R0=Y8.AND.S3
575 IF S3 THEN P4=P4.OR.01H ELSE P4=P4.AND.254
579 IF R0 THEN P3=P3.OR.10H ELSE P3=P3.AND.239
580 XBY(0F820H)=P4:XBY(0F420H)=P3
585 XBY(0F200H)=255-((K2*Y9)+((ABS(N3)-DB1)/70)*K6)*S3
595 H3=1:IF (Y9.OR.Y8)=0 THEN H3=0
596 RETURN
REM SWING SUBROUTINE
600 IF XBY(6002H)<26 THEN A9=0:GOSUB 1800
602 N4=XBY(0F012H)-119
604 IF (N4>DB2).AND.(N4<126) THEN Y7=1 ELSE Y7=0
605 IF (N4<-DB2).AND.(N4>-118) THEN Y6=1 ELSE Y6=0
618 IF Y6 THEN P1=P1.OR.80H ELSE P1=P1.AND.127
620 XBY(0F120H)=P1
635 XBY(0F210H)=255-(K4+((ABS(N4)-DB2)/45)*K3)*S4*(Y7.OR.Y6)
646 RETURN
REM RIGHT TRACK SUBROUTINE
650 IF XBY(6004H)<26 THEN M0=0:GOSUB 1900
653 IF (N5>DB1).AND.(N5<126) THEN Y5=1 ELSE Y5=0
654 IF (N5<-DB1).AND.(N5>-118) THEN Y4=1 ELSE Y4=0
668 IF Y4 THEN P2=P2.OR.10H ELSE P2=P2.AND.239
669 XBY(0F220H)=P2:GOSUB 600
670 R2=S5.AND.(Y2.OR.Y3.OR.Y4.OR.Y5).AND.(1-M4)
679 IF R2 THEN P2=P2.OR.40H ELSE P2=P2.AND.191
680 XBY(0F220H)=P2
685 XBY(0F400H)=255-(K2+((ABS(N5)-DB1)/95)*K1)*S5*(Y4.OR.Y5)
695 H5=1:IF (Y5.OR.Y4)=0 THEN H5=0
696 RETURN
```

```
REM LEFT TRACK SUBROUTINE
700 IF XBY(6005H)<26 THEN M1=0:GOSUB 1900
703 IF (N6>DB1).AND.(N6<126) THEN Y3=1 ELSE Y3=0
704 IF (N6<-DB1).AND.(N6>-118) THEN Y2=1 ELSE Y2=0
718 IF Y2 THEN P2=P2.OR.20H ELSE P2=P2.AND.223
719 XBY(0F220H)=P2:GOSUB 600
720 R2=S6.AND.(Y2.OR.Y3.OR.Y4.OR.Y5).AND.(1-M4)
729 IF R2 THEN P2=P2.OR.40H ELSE P2=P2.AND.191
730 XBY(0F220H)=P2
735 XBY(0F410H)=255-(K2+((ABS(N6)-DB1)/95)*K1)*S6*(Y2.OR.Y3)
745 H6=1:IF (Y3.OR.Y2)=0 THEN H6=0
748 RETURN
REM COUNTERWEIGHT HANDLING SUBROUTINE
950 Y0=SGN(XBY(0C002H).AND.8H):Y1=SGN(XBY(0C002H).AND.10H)
960 IF Y1=1 THEN N3=50
965 IF Y0=1 THEN N3=-50
998 RETURN
REM CHARGE PRESSURE RESET/OUT OF RANGE SUBROUTINE
1200 R4=A6.AND.A7.AND.A8.AND.A9.AND.M0.AND.M1
1201 IF R4=0 THEN P4=P4.OR.20H ELSE P4=P4.AND.223
1202 XBY(0F820H)=P4
1205 IF XBY(6002H)>30 THEN A9=1:GOSUB 1800
1207 IF XBY(6003H)>30 THEN A8=1
1210 IF XBY(6004H)>30 THEN M0=1:GOSUB 1900
1215 IF XBY(6005H)>30 THEN M1=1:GOSUB 1900
1220 IF XBY(6000H)>30 THEN A6=1
1225 IF XBY(6001H)>30 THEN A7=1
1230 IF XBY(6000H)>110 THEN A6=0
1235 IF XBY(6001H)>110 THEN A7=0
1240 IF XBY(6003H)>110 THEN A8=0
1245 IF XBY(6002H)>110 THEN A9=0
1250 IF XBY(6004H)>110 THEN M0=0
1255 IF XBY(6005H)>110 THEN M1=0
1260 R4=A6.AND.A7.AND.A8.AND.A9.AND.M0.AND.M1
1265 IF R4=0 THEN P4=P4.OR.20H ELSE P4=P4.AND.223
1270 XBY(0F820H)=P4
1295 RETURN
REM OPERATING MODE SUBROUTINE
```

```
1300 F1=SGN(XBY(0C000H).AND.1H):F2=SGN(XBY(0C000H).AND.2H)
1306 F3=SGN(XBY(0C000H).AND.4H):F7=SGN(XBY(0C000H).AND.40H)
1308 X0=SGN(XBY(0C001H).AND.2H):X1=SGN(XBY(0C001H).AND.4H)
1310 X2=SGN(XBY(0C001H).AND.8H):X3=SGN(XBY(0C001H).AND.10H)
1312 F6=SGN(XBY(0C000H).AND.20H):F6=F6.AND.(1-F3)
1314 M2=F1.AND.F7:M4=X0.OR.X1.OR.X2.OR.X3
1316 M3=F2.AND.F7
1319 IF (F1.OR.F2.OR.F7) THEN P4=P4.OR.80H ELSE P4=P4.AND.127
1320 XBY(0F820H)=P4
1350 IF ((F1.OR.F2)-F7)<>0 THEN GOSUB 2000:GOTO 1300
1360 IF M2=1 THEN P3=P3.OR.224:P4=P4.OR.64
1365 IF M3=1 THEN P3=P3.OR.160
1370 XBY(0F420H)=P3:XBY(0F820H)=P4
1395 RETURN
REM FRONT HOIST DRUM - CLAMSHELL MODE ROUTINE
1400 AZ=(A0.OR.A1.OR.A2.OR.A3)
1420 XBY(0F100H)=255-((K2*A3)+((ABS(N1)-DB1)/95)*K1*L1)*(AZ)*S1
1495 GOTO 496
REM REAR HOIST DRUM - CLAMSHELL MODE ROUTINE
1500 N1=N1+N2:IF N1>120 THEN N1=120
1505 IF ABS(N1)<DB1 THEN N1=DB1
1510 L=(128-XBY(0F016H))/400
1515 IF L>0 THEN L1=1-L:L2=1 ELSE L1=1:L2=1+L
1520 XBY(0F110H)=255-((K2*A1)+((ABS(N2)-DB1)/95)*K1*L2)*(A1.OR.A0)*S2
1595 GOTO 546
REM FRONT HOIST DRUM - FREE FALL MODE ROUTINE
1600 IF (A2.OR.A3)=0 THEN P4=P4.OR.40H ELSE P4=P4.AND.191
1605 XBY(0F820H)=P4
1695 GOTO 493
REM REAR HOIST DRUM - FREE FALL MODE ROUTINE
1700 IF (A1.OR.A0)=0 THEN P3=P3.OR.40H ELSE P3=P3.AND.191
1705 XBY(0F420H)=P3
1795 GOTO 542
REM SWING SUPPLY RELAY AND BRAKE SUBROUTINE
1800 S4=F6.AND.A9:R1=S4
1810 IF S4 THEN P4=P4.OR.08H ELSE P4=P4.AND.247
1820 IF R1 THEN P2=P2.OR.80H ELSE P2=P2.AND.127
1850 XBY(0F220H)=P2:XBY(0F820H)=P4
```

```
1895 RETURN
REM TRACK SUPPLY RELAY SUBROUTINE
1900 S5=M0:S6=M1
1910 IF (S5.AND.S6) THEN P4=P4.OR.10H ELSE P4=P4.AND.239
1920 XBY(0F820H)=P4
1995 RETURN
REM F-FALL WARNING LIGHT SUBROUTINE
2000 P3=P3.AND.31:P4=P4.AND.63
2007 XBY(0F420H)=P3:XBY(0F820H)=P4
2010 FOR EE=1 TO 100:NEXT EE
2095 RETURN
```

I claim:

1. A control system for operation of a liftcrane comprising:

controls for outputting signals for operation of the liftcrane mechanical functions of the liftcrane, liftcrane mechanical subsystems powered by a closed loop hydraulic system, and a programmable controller responsive to said controls and connected to said liftcrane mechanical subsystems, said controller adapted to run a routine for controlling said liftcrane mechanical subsystems to define operation of the liftcrane, sensors responsive to said mechanical subsystems, said sensors connected to said controller for providing information about the status of said mechanical subsystems to said controller;

and further in which said controller comprises:

an interface connected to said controls and said sensors, and a computer connected to said interface; and further in which said controls comprises a mode selector adapted to provide an output indicative of a specialized liftcrane task.

2. The control system of claim 1 in which said controls further comprise:

variable controls adapted to provide an analog output, and switch controls adapted to provide a digital output.

3. The control system of claim 2 in which said sensors further comprise:

analog sensors adapted to provide an analog output, and digital sensors adapted to provide a digital output.

4. The control system of claim 3 in which said interface further comprises:

an analog to digital interface connected to said variable controls and said analog sensors, and further in which said analog to digital interface is adapted to convert an analog signal from said variable controls and said analog sensors to a digital signal for output to said computer, and further in which said analog to digital interface is adapted to convert a digital signal from said computer to an analog signal for output said mechanical subsystems, and a digital to digital interface connected to said switch controls, said mode selector and said digital sensors, and further in which said digital to digital interface is adapted to convert a digital signal from said switch controls, said mode selector and said digital sensors to a digital signal for output to said computer, and further in which said digital to digital interface is adapted to convert a digital signal from said computer to a digital signal for output said mechanical subsystems.

5. The control system of claim 1 in which the routine that said controller is adapted to convert is further characterized as a routine that includes:

an initialization subroutine responsive to signals from said controls and said sensors indicative of the status of said mechanical subsystems, an operating mode subroutine responsive to said initialization subroutine and adapted to monitor operator mode selection based upon signals from said controls, a charge pressure reset subroutine responsive to said operating mode subroutine adapted to monitor and enable operation of the liftcrane based upon information about the status of said mechanical subsystems provided by said sensors, and a director subroutine responsive to said charge pressure reset subroutine, said director subroutine adapted to monitor information from said controls, branch to one or more subroutines associated with operation of said mechanical subsystems, and return to the operating mode subroutine so that the routine can continue to cycle.

6. The control system of claim 5 in which the subroutines for the control of the operation said mechanical subsystems that are part of the routine that said controller is adapted to run further include:

a front hoist drum subroutine;

a rear hoist drum subroutine;

a boom hoist drum subroutine;

a swing subroutine;

a right track subroutine, and a left track subroutine.

7. The control system of claim 6 in which the operating mode subroutine that is part of the routine that said controller is adapted to run further comprises:

a free-fall mode subroutine, and a clamshell mode subroutine.

8. The control system of claim 7 in which the free-fall mode subroutine that is part of the routine that said controller is adapted to run further comprises:

a front hoist drum free fall mode subroutine; and a rear hoist drum free fall mode subroutine.

9. The control system of claim 8 in which the clamshell mode subroutine is part of the routine that said controller is adapted to run further comprises:

a front hoist drum clamshell mode subroutine, and a rear hoist drum clamshell mode subroutine.

10. The control system of claim 1 in which the closed loop hydraulic system that powers said mechanical subsystems is characterized as further comprising:

a plurality of pumps responsive to an engine, a plurality of actuators each associated with a pump of said plurality of pumps, and further in which each actuator is also associated with a mechanical subsystem, and a plurality of closed hydraulic loops connected each of said plurality of pumps to one of said plurality of actuators whereby actuation of said mechanical subsystems can be effected by the output of each of said plurality of hydraulic pumps.

11. The control system of claim 10 in which the closed loop hydraulic system that powers said mechanical subsystems is further characterized as comprising:

a reservoir coupled to the engine, said reservoir adapted to provide make-up hydraulic fluid for the plurality of closed hydraulic loops.

12. The control system of claim 11 in which the closed loop hydraulic system that powers said mechanical subsystems is further characterized as comprising:

a diverting valve responsive to said controller, said diverting valve connected to two or more closed hydraulic loops whereby two or more pumps of said plurality of pumps can be connected to one actuator of said plurality of actuators.

13. The control system for operation of a liftcrane of claim 1 in which said routine includes at least one subroutine for operating at least one of said mechanical subsystems, said subroutine comprising at least one of:

a front hoist drum subroutine, a rear hoist drum subroutine, a boom hoist drum subroutine, a swing subroutine, a right track subroutine, and a left track subroutine.

14. In a liftcrane that includes liftcrane mechanical subsystems powered by a closed loop hydraulic system and controls for outputting signals for operating the liftcrane, a control system for operation of a liftcrane comprising:

a programmable controller responsive to the controls and connected to the liftcrane mechanical subsystems, said controller including a routine adapted to control the liftcrane mechanical subsystems to define operation of the liftcrane sensors responsive to the mechanical subsystems, said sensors connected to said controller for providing information about the status of the mechanical subsystems to said controller;

and further in which said controller further comprises:

an interface connected to the controls and said sensors, and a computer connected to said interface; and further in which the routine that said controller is adapted to run is further characterized as a routine that includes a charge pressure reset subroutine adapted to monitor and enable operation of the liftcrane based upon information about the status of the mechanical subsystems provided by said sensors.

15. The control system of claim 14 in which the routine that said controller is adapted to run is further characterized as a routine that includes:

an initialization subroutine responsive to signals from the controls and said sensors indicative of the status of the mechanical subsystems, an operating mode subroutine responsive to said initialization subroutine and adapted to monitor operator mode selection based upon signals from the controls, and a director subroutine responsive to said charge pressure reset subroutine, said director subroutine adapted to monitor information from the controls, branch to one or more subroutines associated with operation of the mechanical subsystems, and return to the operating mode subroutine so that the routine can continue to cycle.

16. The control system of claim 15 in which the subroutine for the control of the operation the mechanical subsystems that are part of the routine that said controller is adapted to run further include:

a front hoist drum subroutine, a rear hoist drum subroutine, a boom hoist drum subroutine, a swing subroutine, a right track subroutine, and a left track subroutine.

17. The control system for operation of a liftcrane of claim 14 in which the routine that said controller is adapted to run includes at least one of:

a front hoist drum subroutine, a rear hoist drum subroutine, a boom hoist drum subroutine, a swing subroutine, a right track subroutine, and a left track subroutine.

18. In a liftcrane that includes liftcrane mechanical subsystems powered by a closed loop hydraulic system, controls for outputting signals for operating the liftcrane, a controller responsive to the controls and connected to the liftcrane mechanical subsystems, and sensors responsive to the liftcrane mechanical subsystems and connected to the controller for providing information about the status of the liftcrane mechanical subsystems to the controller, a control routine for operation of the liftcrane and adapted to run on the controller, said control routine comprising:

an initialization subroutine responsive to signals from the controls and the sensors, an operating mode subroutine responsive to said initialization subroutine and adapted to monitor praetor mode selection based upon signals from the controls, a charge pressure reset subroutine responsive to said operating mode subroutine adapted to monitor and enable operation of the liftcrane based upon information about the status of the liftcrane mechanical subsystems provided by the sensors, and a director subroutine responsive to said charge pressure reset subroutine, said director subroutine adapted to monitor information from the controls, branch to one or more subroutines associated with operation of the liftcrane mechanical subsystems, and return to the operating mode subroutine so that the routine can continue to cycle.

19. The control routine of claim 18 in which the subroutines for the control of the operation the mechanical subsystems further comprise:

a front hoist drum subroutine,
a rear hoist drum subroutine,
a boom hoist drum subroutine,
a swing subroutine,
a right track subroutine, and
a left track subroutine.

20. The control routine for operation of the liftcrane of claim 18 comprising at least one of:

a front hoist drum subroutine,
a rear hoist drum subroutine,
a boom hoist drum subroutine,
a swing subroutine,
a right track subroutine, and
a left track subroutine.

* * * * *

US005189605C1

(12) EX PARTE REEXAMINATION CERTIFICATE (5104th)

United States Patent (10) Number: US 5,189,605 C1

Zuehlke et al. (45) Certificate Issued: May 3, 2005

(54) CONTROL AND HYDRAULIC SYSTEM FOR A LIFTCRANE

(75) Inventors: Arthur Zuehlke, Manitowoc, WI (US); David Pech, Manitowoc, WI (US)

(73) Assignee: Manitowoc Crane Group, Inc., Reno, NV (US)

Reexamination Request:
No. 90/005,623, Jan. 28, 2000

Reexamination Certificate for:

| | |
|---|---|
| Patent No.: | **5,189,605** |
| Issued: | **Feb. 23, 1993** |
| Appl. No.: | **07/418,879** |
| Filed: | **Oct. 10, 1989** |

(51) Int. Cl.[7] ........................ G05B 11/01; G05B 11/32; G06F 19/00

(52) U.S. Cl. ............................ 701/50; 700/23; 700/70

(58) Field of Search ............................ 701/50; 700/23, 700/70, 282; 340/685; 91/207; 60/426, 327

(56) References Cited

U.S. PATENT DOCUMENTS

| | | | | |
|---|---|---|---|---|
| 2,030,529 A | | 2/1936 | Nash | 116/114 |
| 3,265,360 A | | 8/1966 | Tax | 254/173 |
| 3,335,568 A | | 8/1967 | Van De Hey | 60/54 |
| 3,531,088 A | | 9/1970 | Kraschnewski | 254/184 |
| 3,620,504 A | | 11/1971 | Morrison | 254/188 |
| 3,661,279 A | | 5/1972 | Macrander | 214/15 R |
| 3,734,564 A | | 5/1973 | McKay et al. | 299/9 |
| 3,759,489 A | | 9/1973 | Jones | 254/173 R |
| 3,851,766 A | | 12/1974 | Gill et al. | 212/20 |
| 4,144,974 A | | 3/1979 | Longthorpe | 212/18 |
| 4,178,591 A | | 12/1979 | Geppert | 340/685 |
| 4,180,171 A | | 12/1979 | Cunningham et al. | 212/61 |
| 4,185,280 A | | 1/1980 | Wilhelm | 340/685 |
| 4,227,676 A | | 10/1980 | Vaillant et al. | 254/277 |
| 4,261,119 A | | 4/1981 | Kubo et al. | 37/195 |
| 4,268,013 A | | 5/1981 | Khan | 254/392 |
| 4,370,713 A | | 1/1983 | McCoy, Jr. et al. | 364/424 |
| 4,451,893 A | | 5/1984 | Izumi et al. | 364/494 |
| 4,489,551 A | | 12/1984 | Watanabe et al. | 60/328 |
| 4,506,791 A | | 3/1985 | Brösigke | 212/190 |
| 4,510,750 A | * | 4/1985 | Izumi et al. | 60/443 |
| 4,514,796 A | | 4/1985 | Saulters et al. | 364/142 |
| 4,532,595 A | | 7/1985 | Wilhelm | 364/463 |
| 4,606,313 A | | 8/1986 | Izumi et al. | 123/386 |
| 4,782,662 A | | 11/1988 | Reeves et al. | 60/327 |
| 4,815,614 A | | 3/1989 | Putkonen et al. | 212/146 |
| 4,953,723 A | | 9/1990 | Saotome et al. | 212/159 |
| 4,969,562 A | | 11/1990 | Saotome | 212/261 |
| 4,995,472 A | | 2/1991 | Hayashi et al. | 364/200 |
| 5,029,067 A | | 7/1991 | Nishida et al. | 364/175 |
| 5,160,056 A | | 11/1992 | Yoshimatsu et al. | 212/155 |

FOREIGN PATENT DOCUMENTS

| | | | |
|---|---|---|---|
| DE | 3115471 | A1 | 10/1982 |
| DE | 3323694 | A1 | 1/1985 |
| DE | 3611553 | C1 | 7/1987 |
| DE | 0364994 | A1 | 10/1989 |
| EP | 0 076 485 | A1 | 4/1983 |
| EP | 0 253 657 | A2 | 1/1988 |
| FR | 72.00064 | | 1/1972 |
| GB | 2 234 728 | A | 2/1991 |
| JP | 55035785 | | 3/1980 |
| JP | 55-52884 | | 4/1980 |
| JP | 56-160458 | | 12/1981 |

(Continued)

OTHER PUBLICATIONS

Engineering Group, Daikin Industries, Ltd., FAQ–Hydraulic System in Machines, vol. 2, pp. 18–21 and 334, 1974.

(Continued)

*Primary Examiner*—Leo Picard

(57) ABSTRACT

A control system for a liftcrane powered by a closed loop hydraulic system. In a liftcrane that includes controls by which an operator can run the liftcrane and mechanical subsystems each powered by a closed loop hydraulic system having a pump and an actuator, the present invention provides a controller responsive to the controls and connected to the mechanical subsystems, and further in which the controller is capable of running a routine for controlling said mechanical subsystems to define operation of the liftcrane.

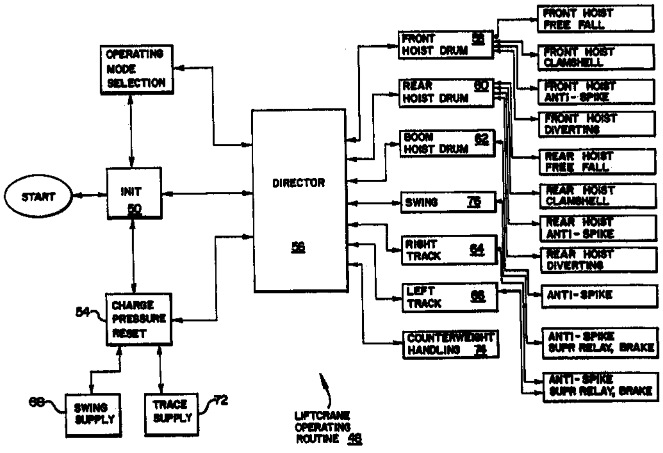

FOREIGN PATENT DOCUMENTS

| | | | |
|---|---|---|---|
| JP | 57-123332 | | 7/1982 |
| JP | 58041126 | A | 3/1983 |
| JP | 58062228 | A | 4/1983 |
| JP | 59-194989 | | 11/1984 |
| JP | 60-125455 | | 7/1985 |
| JP | 61-55093 | | 3/1986 |
| JP | 61151339 | A | 7/1986 |
| JP | 63-31995 | | 2/1988 |
| JP | 63-62902 | | 3/1988 |
| JP | WO 88/05937 | | 11/1988 |
| JP | 1-242712 | | 9/1989 |
| SU | 32 12378/29-11 | | 7/1982 |

OTHER PUBLICATIONS

Rewico shipping document (German and English, 2 pp.) (Mar. 1978).
Confirmation order for LR1300 on Liebherr letterhead (German only, 2 pp.) (Dec. 1976).
Special Customs Invoice (1 p.) (Apr. 1978).
Machine document order No. 0010540 for LR1300 (German only, 1 p.) (May 1978).
Machine document order No. 0010540 for LR1300 (German only, 3 pp.) (Feb. 1978).
Hydraulik/Hydraulic LR1300 Schematic (English and German, 1 p.) (Oct. 1978).
Mannesmann Rexroth, Micro–Controller MC Series 10, Model RD 95050/08.87 (German, 4 pp. and 5 pp. of English translation) (Mar. 1987).
Dr. Eng S. Miyakawa, "Dynamisches Verhalten eines Hubwerks mit einem geschlossenen Hydraulikkreislauf" (Dynamic response of a hoist unit with a closed hydraulic circuit), MobilHydraulik, olhydraulik und pneumatik, (German, 4 pp. and 8 pp. of English translation) (1987).

N. Rückgauer, "Hydraulic Drives in Crane Construction", in *Ölhydraulik und pneumatik*, pp. 150–163 (1986). (Translation only).

Dip. Ing Gotthard Drieschner, "Computer–Hydraulik am Bau" (Computer Hydraulics in the Construction) *Mikroprozessor in Hydraulikbaggern Fluid*, pp. 21 & 22 (Jun. 1988).

Dipl. –Ing. U. Melcinger, Prof. Dr. –Ing. W. Poppy "Elektronisch geregeltes Drei–Pumpen–System" (Electronically controlled Three–Pump–System), *Ölhydraulik und pneumatik*, pp. 549–553 (1988).

Dr. –Ing. P. Wüsthof, Lohr/Main "Verbesserte Energieausnutzung in der Mobilhydraulik" (Improved Power Exploitation in Mobile Hydraulics) *Ölhydraulik und pneumatik* pp. 637–643 (1986).

Dipl. Ing. N. Rückgauer, Ulm, Hydraulische Antriebe im Kranbau (Hydraulic Drives in Crane Construction), *Ölhydraulik und pneumatik* pp. 150–163 (1986).

Dr. –Ing. H. Hesse, "Elektronik in der Mobilhydraulik" (Electronics in Mobile Hydraulics) *Ölhydraulik und pneumatik*, pp. 537–548; (1988).

Liebherr "Diesel–Hydraulic Floating Crane" *Betriebsanleitung Instruction manual Manual d'instruction* 1st Edition: 400 pages; Sep. 24, 1986.

LR 1650/800 Betriebsanleitung Operating Instructions, *Liebherr*, 89 pages (Feb. 1987).

The Liebherr "Technical Data Cable Excavator" (Oct. 1986).

The Liebherr Technical Description: HS 840, HS 850, HS 870 (Apr. 1985).

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 5, line 47 to column 6, line 22:

The liftcrane operating routine 48 is intended to run continuously on the CPU 28 (in FIG. 1) in a loop fashion. The liftcrane operating routine 48 reads information provided from the interface 20 (in FIG. 1) which appears as data accessible to the routine at certain addresses. Likewise, the information output by liftcrane operating routine 48 is read by the interface 20 and is used to operate the mechanical subsystems 10. When the liftcrane is initially turned on (or if the routine reboots itself or restores itself due to a transient fault), the liftcrane operating routine 48 includes an initialization subroutine 50 that initializes variables and reads certain parameters. Following this, an operating mode subroutine 52 reads data indicating which operating mode has been selected by the operator for the liftcrane. Next, a charge pressure reset/ out of range subroutine 54 checks to determine if the hydraulic pressure in the liftcrane is in a proper operating range. Following this is a director subroutine 56 which is the main subroutine for the operation of the crane. From the director subroutine 56 the program branches into one of five subroutines associated with operation of the major mechanical subsystems. These subroutines control the function of the major mechanical subsystems with which they are associated front hoist drum subroutine 58, rear hoist drum subroutine 60, boom hoist drum subroutine 62 right track subroutine 64, and left track subroutine 66. After these subroutines finish, the liftcrane operating routine 48 returns to the operating mode subroutine 52 and the starts all over again. As the routine cycles, changes made by the operator at the controls will be read by the liftcrane operating routine and changes in the operation of mechanical systems will follow. In addition, there are subroutines for swing supply and track supply that are run from the charge pressure reset/ out-of-range subroutine 54. In the event that the pressure is not in the proper operating range, brakes will be applied to the swing and track to insure safety. A counterweight handling subroutine 74 branches from the director subroutine 56. A swing subroutine 76 also branches from the director subroutine [54] *56*. The swing subroutine 76 is called during each cycle of the director subroutine [54] *56* to enhance a smooth movement of the swing.

AS A RESULT OF REEXAMINATION, IT HAS BEEN DETERMINED THAT:

The patentability of claims 14–20 is confirmed.

Claims 2–4 are cancelled.

Claims 1 and 5 are determined to be patentable as amended.

Claims 6–13, dependent on an amended claim, are determined to be patentable.

New claims 21–57 are added and determined to be patentable.

1. A control system for operation of a liftcrane comprising:

controls for outputting signals for operation of the liftcrane mechanical functions of the liftcrane*, wherein the controls comprise variable controls adapted to provide an analog output and switch controls adapted to provide a digital output*, liftcrane mechanical subsystems powered by a closed loop hydraulic system, [and]

a programmable controller responsive to said controls and connected to said liftcrane mechanical subsystems, said controller adapted to run a routine for controlling said liftcrane mechanical subsystems to define operation of the liftcrane, *and* sensors responsive to said mechanical subsystems, said sensors connected to said controller for providing information about the status of said mechanical subsystems to said controller*, wherein the sensors comprise analog sensors adapted to provide an analog output and digital sensors adapted to provide a digital output*;

and further in which said controller comprises:

an interface connected to said controls and said sensors, and a computer connected to said interface; and further in which said controls comprises a mode selector adapted to provide an output indicative of a specialized liftcrane task*;*

*and further wherein the interface comprises:*

*an analog to digital interface connected to said variable controls and said analog sensors, and further in which said analog to digital interface is adapted to convert an analog signal from said variable controls and said analog sensors to a digital signal for output to said computer, and further in which said analog to digital interface is adapted to convert a digital signal from said computer to an analog signal for output to said mechanical subsystems, and*

*a digital to digital interface connected to said switch controls, said mode selector and said digital sensors, and further in which said digital to digital interface is adapted to convert a digital signal from said switch controls, said mode selector and said digital sensors to a digital signal for output to said computer, and further in which said digital to digital interface is adapted to convert a digital signal from said computer to a digital signal for output to said mechanical subsystems.*

5. [The control system of claim 1 in which] *A control system for operation of a liftcrane comprising:*

*controls for outputting signals for operation of the liftcrane mechanical functions of the liftcrane,*

*liftcrane mechanical subsystems powered by a closed loop hydraulic system,*

*a programmable controller responsive to said controls and connected to said liftcrane mechanical subsystems, said controller adapted to run a routine for controlling said liftcrane mechanical subsystems to define operation of the liftcrane, and*

*sensors responsive to said mechanical subsystems, said sensors connected to said controller for providing information about the status of said mechanical subsystems to said controller;*

*and further in which said controller comprises:*

*an interface connected to said controls and said sensors, and*

*a computer connected to said interface; and further in which said controls comprises a mode selector adapted to provide an output indicative of a specialized liftcrane task, wherein* the routine [that said controller is adapted to convert] is further characterized as a routine that includes:

an initialization subroutine responsive to signals from said controls and said sensors indicative of the status of said mechanical subsystems, an operating mode subroutine responsive to said initialization subroutine and adapted to monitor operator mode selection based upon signals from said controls, a charge pressure reset subroutine responsive to said operating mode subroutine adapted to monitor and enable operation of the liftcrane based upon information about the status of said mechanical subsystems provided by said sensors, and a director subroutine responsive to said charge pressure reset subroutine, said director subroutine adapted to monitor information from said controls, branch to one or more subroutines associated with operation of said mechanical subsystems, and return to the operating mode subroutine so that the routine can continue to cycle.

*21. The control system for operation of the liftcrane of claim 15 in which the operating mode subroutine further comprises:*

*a free-fall mode subroutine, and*

*a clamshell mode subroutine.*

*22. The control system for operation of the liftcrane of claim 21 in which the free-fall mode subroutine further comprises:*

*a front hoist drum free fall mode subroutine; and*

*a rear hoist drum free fall mode subroutine.*

*23. The control system for operation of the liftcrane of claim 21 in which the clamshell mode subroutine further comprises:*

*a front hoist drum clamshell mode subroutine, and*

*a rear hoist drum clamshell mode subroutine.*

*24. The control system for operation of the liftcrane of claim 15 in which the closed loop hydraulic system further comprises:*

*a plurality of pumps powered by an engine,*

*a plurality of actuators each associated with a pump of said plurality of pumps, and further in which each actuator is also associated with a mechanical subsystem, and*

*a plurality of closed hydraulic loops connecting each of said plurality of pumps to one of said plurality of actuators whereby actuation of said mechanical subsystems can be effected by an output of said plurality of pumps.*

*25. The control system for operation of the liftcrane of claim 24 in which the closed loop hydraulic system further comprises:*

*a reservoir coupled to the pumps, said reservoir adapted to provide make-up hydraulic fluid for the plurality of closed hydraulic loops.*

*26. The control system for operation of the liftcrane of claim 25 in which the closed loop hydraulic system further comprises:*

*a diverting valve responsive to said controller, said diverting valve being connected to two or more closed hydraulic loops whereby two or more pumps of said plurality of pumps can be connected to one actuator of said plurality of actuators.*

*27. The control system for operation of the liftcrane of claim 15 in which the liftcrane further comprises:*

*variable controls adapted to provide an analog output, and*

*switch controls adapted to provide a digital output.*

*28. The control system for operation of the liftcrane of claim 27 in which said sensors further comprise:*

*analog sensors adapted to provide an analog output, and*

*digital sensors adapted to provide a digital output.*

*29. The control system for operation of the liftcrane of claim 28 in which said interface further comprises:*

*an analog to digital interface connected to said variable controls and said analog sensors, and further in which said analog to digital interface is adapted to convert an analog signal from said variabe controls and said analog sensors to a digital signal for output to said computer, and further in which said analog to digital interface is adapted to convert a digital signal from said computer to an analog signal for output to said mechanical subsystems, and*

*a digital to digital interface connected to said switch controls, a mode selector and said digital sensors, and further in which said digital to digital interface is adapted to convert a digital signal from said switch controls, said mode selector and said digital sensors to a digital signal for output to said computer, and further in which said digital to digital interface is adapted to convert a digital signal from said computer to a digital signal for output to said mechanical subsystems.*

*30. The control system for operation of the liftcrane of claim 15 wherein the mode selection includes a mode selected from the group consisting of a hydraulic mode, a counter weight handling mode, a crawler extension mode, a high speed mode, a clamshell mode and a free-fall mode.*

*31. The control system for operation of the liftcrane of claim 15 wherein the mode selection tailors the operation of the liftcrane for a particular task being performed.*

*32. The control system for operation of the liftcrane of claim 14 in which the closed loop hydraulic system that powers said mechanical subsystems further comprises:*

*a plurality of pumps powered by an engine,*

*a plurality of actuators each associated with a pump of said plurality of pumps, and further in which each actuator is also associated with a mechanical subsystem, and*

*a plurality of closed hydraulic loops connecting each of said plurality of pumps to one of said plurality of actuators whereby actuation of said mechanical subsystems can be effected by an output of said plurality of pumps.*

*33. The control system for operation of the liftcrane of claim 32 in which the closed loop hydraulic system that powers said mechanical subsystems further comprises:*

*a reservoir coupled to the pumps, said reservoir adapted to provide make-up hydraulic fluid for the plurality of closed hydraulic loops.*

*34. The control system for operation of the liftcrane of claim 33 in which the closed loop hydraulic system that powers said mechanical subsystems further comprises:*

*a diverting valve responsive to said controller, said diverting valve being connected to two or more closed hydraulic loops whereby two or more pumps of said plurality of pumps can be connected to one actuator of said plurality of actuators.*

*35. The control system for operation of the liftcrane of claim 14 in which the liftcrane further comprises:*

*variable controls adapted to provide an analog output, and*

*switch controls adapted to provide a digital output.*

*36. The control system for operation of the liftcrane of claim 35 in which said sensors further comprise:*

*analog sensors adapted to provide an analog output, and*

*digital sensors adapted to provide a digital output.*

*37. The control system for operation of the liftcrane of claim 36 in which said interface further comprises:*

*an analog to digital interface connected to said variable controls and said analog sensors, and further in which said analog to digital interface is adapted to convert an analog signal from said variable controls and said analog sensors to a digital signal for output to said computer, and further in which said analog to digital interface is adapted to convert a digital signal from said computer to an analog signal for output to said mechanical subsystems, and*

*a digital to digital interface connected to said switch controls, a mode selector and said digital sensors, and further in which said digital to digital interface is adapted to convert a digital signal from said switch controls, said mode selector and said digital sensors to a digital signal for output to said computer, and further in which said digital to digital interface is adapted to convert a digital signal from said computer to a digital signal for output to said mechanical subsystems.*

*38. The control system for operation of the liftcrane of claim 14 further including at least one brake, wherein the at least one brake of the liftcrane is applied if a hydraulic pressure is outside of a determined operating range.*

*39. The control system for operation of the liftcrane of claim 14 in which the routine that said controller is adapted to run further comprises:*

*a free-fall mode subroutine, and*

*a clamshell mode subroutine.*

*40. The control system for operation of the liftcrane of claim 39 in which the free-fall mode subroutine that is part of the routine that said controller is adapted to run further comprises:*

*a front hoist drum free fall mode subroutine; and*

*a rear hoist drum free fall mode subroutine.*

*41. The control system for operation of the liftcrane of claim 39 in which the clamshell mode subroutine that is part of the routine that said controller is adapted to run further comprises:*

*a front hoist drum clamshell mode subroutine, and*

*a rear hoist drum clamshell mode subroutine.*

*42. The control system for operaton of the liftcrane of claim 14 wherein the programmable controller provides information regarding the mechanical subsystems to an operator.*

*43. The control system for operation of the liftcrane of claim 14 wherein the routine adapted to control the liftcrane mechanical subsystems operates continuously on the programmable controller.*

*44. The control system for operation of the liftcrane of claim 14 wherein the programmable controller can provide play back of a liftcrane operation.*

*45. The control routine for operation of the liftcrane of claim 18 in which the operating mode subroutine further comprises:*

*a free-fall mode subroutine, and*

*a clamshell mode subroutine.*

*46. The control routine for operation of the liftcrane of claim 45 in which the free-fall mode subroutine further comprises:*

*a front hoist drum free fall mode subroutine; and*

*a rear hoist drum free fall mode subroutine.*

*47. The control routine for operation of the liftcrane of claim 18 in which the closed loop hydraulic system further comprises:*

*a plurality of pumps powered by an engine,*

*a plurality of actuators each associated with a pump of said plurality of pumps, and further in which each actuator is also associated with a mechanical subsystem, and*

*a plurality of closed hydraulic loops connecting each of said plurality of pumps to one of said plurality of actuators whereby actuation of said mechanical subsystems can be effected by an output of said plurality of pumps.*

*48. The control routine for operation of the liftcrane of claim 47 in which the closed loop hydraulic system further comprises:*

*a reservoir coupled to the pumps, said reservoir adapted to provide make-up hydraulic fluid for the plurality of closed hydraulic loops.*

*49. The control routine for operation of the liftcrane of claim 48 in which the closed loop hydraulic system further comprises:*

*a diverting valve responsive to said controller, said diverting valve being connected to two or more closed hydraulic loops whereby two or more pumps of said plurality of pumps can be connected to one actuator of said plurality of actuators.*

*50. The control routine for operation of the liftcrane of claim 18 in which the liftcrane further comprises:*

*variable controls adapted to provide an analog output, and*

*switch controls adapted to provide a digital output.*

*51. The control routine for operation of the liftcrane of claim 50 in which the sensors further comprise:*

*analog sensors adapted to provide an analog output, and*

*digital sensors adapted to provide a digital output.*

*52. The control routine for operation of the liftcrane of claim 51 in which the controller further comprises an interface comprising:*

*an analog to digital interface connected to said variable controls and said analog sensors, and further in which said analog to digital interface is adapted to convert an analog signal from said variable controls and said analog sensors to a digital signal for output to said controller, and further in which said analog to digital interface is adapted to convert a digital signal from said controller to an analog signal for output to said mechanical subsystems, and*

*a digital to digital interface connected to said switch controls, a mode selector and said digital sensors, and further in which said digital to digital interface is adapted to convert a digital signal from said switch controls, said mode selector and said digital sensors to a digital signal for output to said controller, and further*

*in which said digital to digital interface is adapted to convert a digital signal from said controller to a digital signal for output to said mechanical subsystems.*

*53. The control routine for operation of the liftcrane of claim 18 wherein the mode selection includes a mode selected from the group consisting of a hydraulic mode, a counter weight handling mode, a crawler extension mode, a high speed mode, a clamshell mode and a free-fall mode.*

*54. The control routine for operation of the liftcrane of claim 18 wherein mode selection tailors the operation of the liftcrane for a particular task being performed.*

*55. The control routine for operation of the liftcrane of claim 18 wherein the controller provides information regarding the mechanical subsystems to an operator.*

*56. The control routine for operation of the liftcrane of claim 18 wherein the control routine operates continuously on the controller.*

*57. The control routine for operation of the liftcrane of claim 18 wherein the controller can provide play back of a liftcrane operation.*

* * * * *